(12) United States Patent
Miyake et al.

(10) Patent No.: US 6,526,001 B1
(45) Date of Patent: Feb. 25, 2003

(54) MAGNETIC HEAD

(75) Inventors: Tomoyuki Miyake, Nara (JP); Seiichi Nagatome, Tenri (JP); Toshio Tahira, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 78 days.

(21) Appl. No.: 09/589,877

(22) Filed: Jun. 9, 2000

(30) Foreign Application Priority Data

Jun. 11, 1999 (JP) .......................................... 11-164796
Sep. 13, 1999 (JP) .......................................... 11-258214

(51) Int. Cl.[7] .............................................. G11B 11/00
(52) U.S. Cl. .................................. 369/13.17; 369/13.23
(58) Field of Search ..................... 369/13, 14, 110.01, 369/13.17, 13.23, 13.18, 13.19; 360/114, 59, 102, 103; 365/122

(56) References Cited

U.S. PATENT DOCUMENTS

| 4,796,241 A | * | 1/1989 | Hayakawa et al. | ........... 369/13 |
| 5,260,921 A | * | 11/1993 | Shibuya et al. | ................ 369/13 |
| 5,361,242 A | * | 11/1994 | Chaya et al. | ................. 369/13 |
| 5,444,678 A | * | 8/1995 | Ogata | ........................... 369/13 |
| 5,615,183 A | * | 3/1997 | Ishii | ............................. 369/13 |

FOREIGN PATENT DOCUMENTS

| JP | 4254904 | | 9/1992 | |
| JP | 5-290426 A | * | 11/1993 | .................. 369/13 |
| JP | 5-325293 A | * | 12/1993 | .................. 369/13 |
| JP | 6-131610 A | * | 5/1994 | .................. 369/13 |
| JP | 10-255206 A | * | 9/1998 | .................. 369/13 |
| JP | 11-149735 A | * | 6/1999 | .................. 369/13 |

* cited by examiner

Primary Examiner—Tan Dinh
(74) Attorney, Agent, or Firm—Birch, Stewart, Kolasch & Birch, LLP

(57) ABSTRACT

A magnetic head of the present invention is to switch a direction of magnetic fields applied to a heated portion in a recording region in accordance with recording information. The magnetic head is composed of a single magnetic pole in a pillar shape and a coil. The magnetic pole is provided on a magnetic base, with one end surface of the magnetic pole brought into contact with the magnetic base. The coil, wound around the magnetic pole, is provided for generating the foregoing magnetic fields. The foregoing arrangement enables suppression of heat generation at the magnetic head, thereby allowing the recording frequency to be set higher, as well as improving the recording rate.

9 Claims, 9 Drawing Sheets

MAGNETIC POLE HEIGHT (mm)

MAGNETIC FIELD INTENSITY WITH
A SET NUMBER OF TURNS OF COIL
(COIL CURRENT: 0.2A)

MAGNETIC FIELD INTENSITY WITH
A SET NUMBER OF TURNS OF COIL
(COIL CURRENT: 0.2A)

MAGNETIC FIELD INTENSITY WITH
A SET INDUCTANCE
(COIL CURRENT: 0.2A)

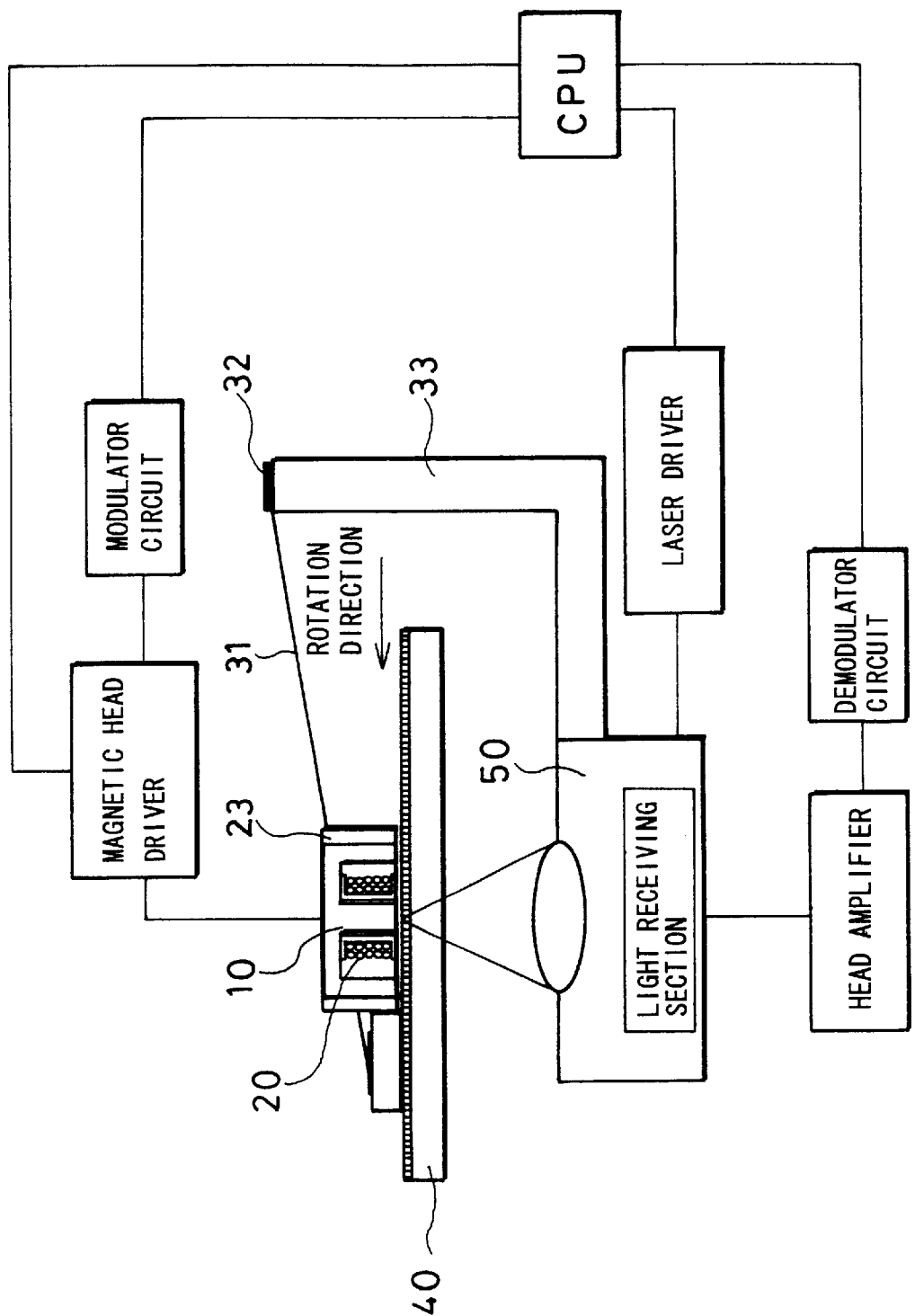

MAGNETIC HEAD

FIELD OF THE INVENTION

The present invention relates to a magnetic head for applying magnetic fields that vary with recorded information with respect to a heated portion in a recording region in a recording medium.

BACKGROUND OF THE INVENTION

The following description will explain an example of a magnetic head used in a MiniDisk (hereinafter referred to as MD) device, while referring to FIGS. 6 through 9. FIG. 6 illustrates an arrangement of a magnetic head, while FIG. 7 is an enlarged view of a magnetic core part and a coil part of the magnetic head. FIG. 8 illustrates an arrangement of a magneto-optical recording medium, and FIG. 9 illustrates an arrangement of a magneto-optical recording-reproducing device.

First, the following description will explain an arrangement of a magnetic head while referring to FIG. 6. FIG. 6 is a cross-sectional view of a magnetic head used with a magneto-optical disk. The magnetic head includes a magnetic field generating section composed of a central magnetic pole 11 that is made of a magnetic material such as Mn—Zn ferrite or the like, a coil 22, and a bobbin 21 made of an insulating material, around which the coil 22 is wound in helical fashion.

This magnetic field generating section is fixed to a magnetic core holder 23 that is a contact-sliding member. Thus, a magnetic head is arranged. The magnetic core holder 23 has a sliding part 24 that is brought into contact with a magneto-optical recording medium (not shown in FIG. 6). The sliding part 24 is formed by molding with a material with a low friction coefficient which is for example a polymer material such as polyarylate, nylon, or polyester, or alternatively, ceramic. The sliding part 24 may be formed with another material, and a tape-like material with a low friction coefficient may be applied to a surface that is brought into contact with a magneto-optical recording medium.

Next, the foregoing magnetic field generating section will be described with reference to FIG. 7.

The magnetic core has an "E"-like shape, composed of a central magnetic pole 11 and yokes 13 on the sides. The yokes 13 are positioned relatively close to the central magnetic pole 11, so as to increase the intensity of the magnetic fields.

The coil section is formed by winding the coil 22 around the bobbin 21, and by attaching it to the central magnetic pole 11 of the E-shape magnetic core. The coil 22 is a wire plated with enamel or a magnetic material (diameter: 80 $\mu$m) and made of a conductive material. The bobbin 21 is aimed to make the height of the coil 22 uniform, and to prevent the coil 22 from being brought into direct contact with the central magnetic pole 11.

FIG. 8 illustrates an arrangement of a magneto-optical recording medium 40. The magneto-optical recording medium 40 is formed by providing a magneto-optical recording film 43 on a transparent substrate 41 made of polycarbonate (PC) or the like, though a dielectric film 42 made of SiN, AlN, or the like is provided between the magneto-optical recording film 43 and the transparent substrate 41. The dielectric film 42 and a reflection film 44 made of Al or the like are provided on the magneto-optical recording film 43, and on top of that, a resin protective layer 45 made of an UV curing resin is provided.

In the case of an MD, since a contact-sliding-type magnetic head is used, a lubrication film 46 made of silicon oil or the like that has a high lubricity is formed on the resin protective film 45. Incidentally, a film that constitutes a single layer implementing the functions of both the resin protective film 45 and the lubrication film 46 has been developed.

A magnetic field modulating method is explained below, with reference to FIG. 9. As shown in FIG. 9, an optical pick-up 50 for projecting laser light is provided on one side to the foregoing magneto-optical recording medium 40, while a magnetic head section 20 that is provided inside the aforementioned magnetic core holder 23 which moves according to a position of a laser spot is provided on the other side to the magneto-optical recording medium 40. The direction of the magnetic fields generated by the magnetic head section 20 is inverted in accordance with recording signals (recording information), whereby signals (information) are recorded on the magneto-optical recording medium 40.

Furthermore, to arrange the magnetic head section 20 and the magnetic core holder 23 so as to be capable of moving appropriately in spite of, if any, fluctuations of the magneto-optical recording medium 40 and dusts and projections on the same, the magnetic head section 20 and the magnetic core holder 23 are supported by a thin elastic member 31 made of metal, normally 30 $\mu$m to 100 $\mu$m in thickness, to which a pressure of 3 mN (milli-newton) to 10 mN is previously applied. An end of the elastic member 31 is fixed by an elastic member fixing member 32. The elastic member fixing member 32 is supported by a connecting arm 33 in a substantial "L" shape, so as to be connected to the aforementioned pick-up 50.

Magnetic fields generated by the magnetic head section 20 vary depending on the distance from a magnetic pole face (end surface) of the central magnetic pole 11 to the magneto-optical recording medium 40. In other words, as the distance increases, greater electric current need flow through the coil 22 in order to generate magnetic fields with a predetermined intensity to be applied to the magneto-optical recording medium 40. In the case where the distance is set constant, the intensity of the magnetic fields is proportional to the electric current. Therefore, in the case of a recording medium that for recording requires magnetic fields of a great intensity, greater electric current need be made to flow through the coil 22. This leads to a rise of the temperature in the magnetic head, that develops into serious problems such as a decrease of the intensity of the magnetic fields due to heat, and damage to the coil 22. For this reason, as the recording medium used in the magnetic field modulation recording, a recording medium requiring small recording magnetic fields has been selected, as compared with that in the case of a light intensity modulation recording medium.

Besides, also in the case where the distance between the magneto-optical recording medium 40 and the magnetic pole face of the central magnetic pole 11 greatly fluctuates, the electric current need be increased for the fluctuation, thereby leading to the same result as above. To keep constant the distance between the magneto-optical recording medium 40 and the magnetic pole face of the central magnetic pole 11, the magnetic core holder 23 for holding the magnetic field generating section composed of the central magnetic pole 11 and the coil 22 need be made of a material that allows smooth sliding, and the magnetic core holder 23 is arranged so that a level difference between the sliding part 24 and the magnetic pole face of the central magnetic pole 11 should be normally in a range of 20 μm to 100 μm.

By bringing the sliding part 24 into contact with the lubrication film 46 while preventing the central magnetic pole 11 from being brought into direct contact with the lubrication film 46 of the magneto-optical recording medium 40, it is made possible to keep constant the distance between the magnetic pole face of the central magnetic pole 11 and the magneto-optical recording medium 40, without a complex structure. Such a magnetic head, called as a sliding-type magnetic head, is generally used in an MD device.

Recently improvement of the recording speed and the recording density have been demanded, and to achieve it, it is required to drive the magnetic head at a higher frequency. However, when driving at a frequency exceeding several MHz, a magnetic loss of a magnetic material increases, and heat generation increases.

In a conventional magnetic head, the central magnetic pole 11 need be formed smaller and positioned as close as possible to the magneto-optical recording medium 40, in order to suppress the heat generation. As long as such a structure is applied, however, accurate position adjustment is required between a position which is irradiated by the laser from the optical pick-up 50 and the magnetic field area, which requires significant improvements in mechanical precision including transport mechanism.

SUMMARY OF THE INVENTION

An object of the present invention is to provide a magnetic head that enables improvement of the recording rate, by suppressing heat generation at the magnetic head to raise a recording frequency.

The magnetic head of the present invention is a magnetic head for switching a direction of magnetic fields applied to a temperature-rising portion in a recording region in accordance with recording information, and to achieve the foregoing object, the magnetic head is characterized by comprising (i) a single magnetic pole in a pillar shape provided on a magnetic body, having one end surface in contact with the magnetic body, and (ii) a coil that is wound around the magnetic pole so as to apply electric current for generating the magnetic fields.

According to the present invention, upon application of the magnetic fields that vary in accordance with recording information to the temperature-rising portion in the recording region, a direction of magnetization at the heated portion is changed in accordance with recording information. Thus, the recording information is recorded.

In the present magnetic head, yokes required in a conventional magnetic head having an E-shape magnetic core can be omitted, since a single magnetic pole is provided. The magnetic flux density in the magnetic pole becomes the lower for the absence of the yokes than that in the case of the conventional magnetic head that requires yokes. Since the magnetic flux density becomes lower, heat generation at the magnetic head is suppressed. In addition, since the foregoing magnetic body has a function of dissipation of heat of the magnetic pole provided on the magnetic body, the heat conducted to the magnetic body is dissipated therefrom. Thus, the cooling is conducted. Consequently, this enables further suppression of rise of temperature.

As described above, since the present magnetic head allows suppression of heat generation, the application of a greater electric current to a coil, or the recording of information at a higher frequency is enabled. Consequently, information can be recorded with magnetic fields of higher intensity.

Furthermore, since the magnetic fields can be made more intensive than that in the conventional case at the same frequency, information can be recorded with a sufficient magnetic field intensity with respect to a recording medium with an inferior sensitivity to the magnetic fields such as a magnetically induced super-resolution (MSR) recording medium. As a result, this enables the recording to a recording medium to that the conventional magnetic head cannot carry out recording.

Furthermore, according to the present invention, the absence of yokes causes the magnetic field distribution from the magnetic pole to become broad, but only a heated portion contributes to the recording, thereby allowing high-density recording to be carried out without any problems, without being affected by the magnetic field distribution.

In the foregoing magnetic head, the coil is preferably wound around in a manner such that the coil is out of contact with the magnetic pole.

In this case, even if the coating with, for example, enamel, over the coil is imperfect, contact of the coil with the magnetic pole can be surely avoided.

The foregoing coil is preferably provided on the magnetic body.

Conventionally, the coil is wound around a bobbin and encircled by yokes, thereby resulting in that heat generated at the magnetic pole and the coil is accumulated in a space defined by the bobbin and the yokes, not being dissipated to outside the magnetic head. Besides, the heat of the yokes is conducted to the coil and the magnetic pole, thereby raising the temperature at the coil and the magnetic pole. The bobbin is made of an insulating material, inferior in dissipation of heat, thereby being incapable of dissipating the heat generated by the coil. These cause the heat generated at the magnetic head to further increase.

To solve this problem, the foregoing coil is provided on the magnetic body, so that the heat generated at the coil is conducted to the magnetic body, thereby being dissipated. The heat generated at the magnetic pole is also conducted to the magnetic body, thereby being dissipated. Besides, since there are neither yoke nor bobbin that hinders dissipation of heat from the magnetic pole and heat from the coil, generation of heat at the magnetic head is surely suppressed as a whole.

Moreover, since a bobbin is unnecessary, the number of members related to the magnetic head can be reduced. Consequently, the costs and the number of steps in the process for producing the magnetic head can be surely reduced.

Furthermore, the magnetic pole preferably has a height in a range of 0.25 mm to 0.5 mm.

In this case, the rate of generation of magnetic fields can be improved, as compared with the case of the conventional magnetic head. Consequently, an improved efficiency of magnetic field generation than that in the case of the conventional magnetic head can be achieved. This leads to suppression of heat generation, thereby allowing recording at a higher frequency. This leads to an increase of a data transfer rate, thereby allowing, for example, higher image quality to be achieved in the case where images are recorded. The intensity of the recording magnetic fields can be made greater than conventionally, and therefore, the magnetic head of the present invention is applicable in the case where the magnetic field intensity required for recording is greater.

For a fuller understanding of the nature and advantages of the invention, reference should be made to the ensuing detailed description taken in conjunction with the accompanying drawings.

BRIEF DESCRIPTION OF THE DRAWINGS

FIG. 9 is an explanatory view illustrating a magneto-optical recording-reproducing device.

DESCRIPTION OF THE PREFERRED EMBODIMENTS

Figure 1:
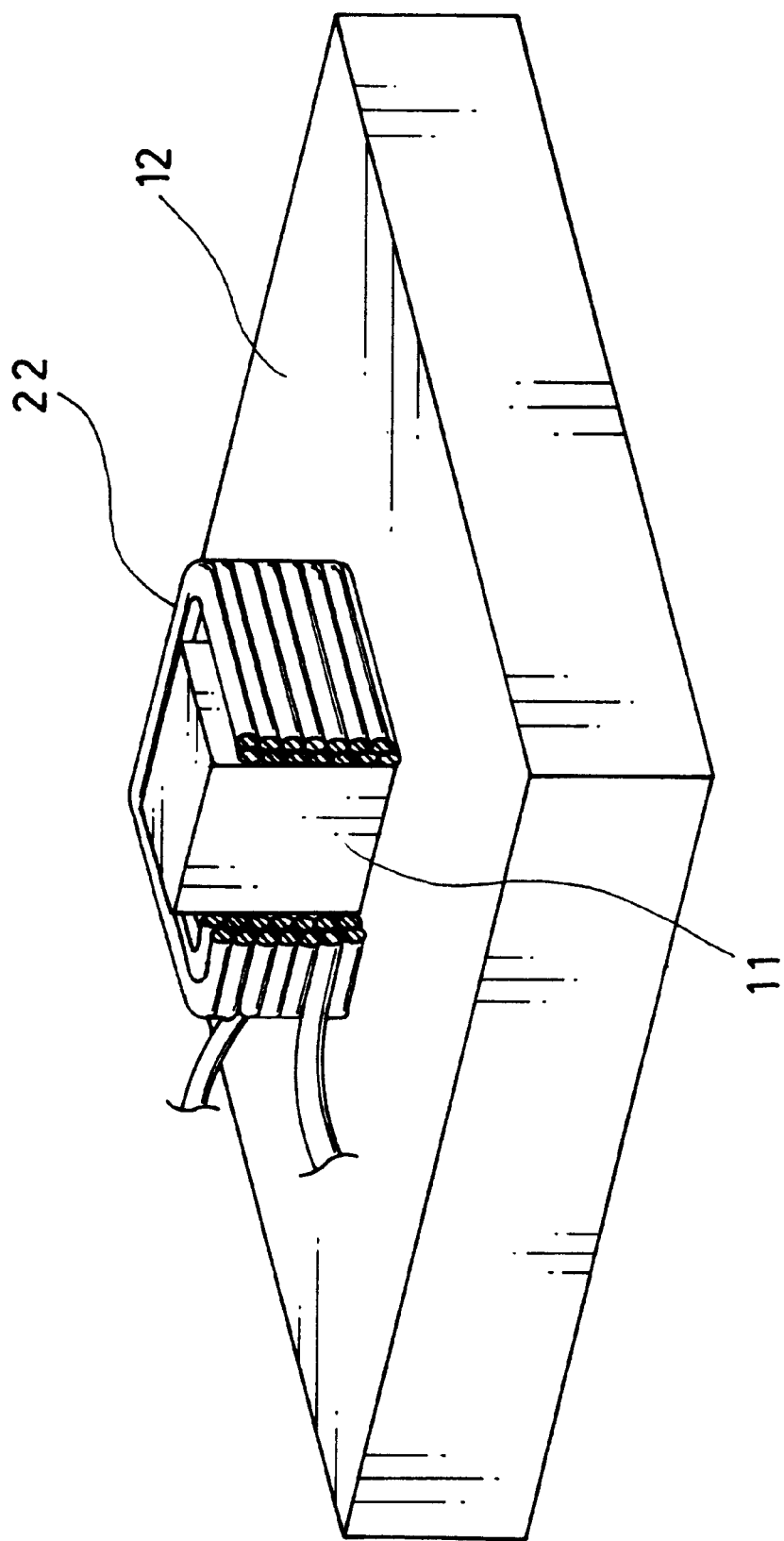
FIG. 1 is an explanatory view illustrating an example of an arrangement of a magnetic head in accordance with the present invention.
Figure 2:
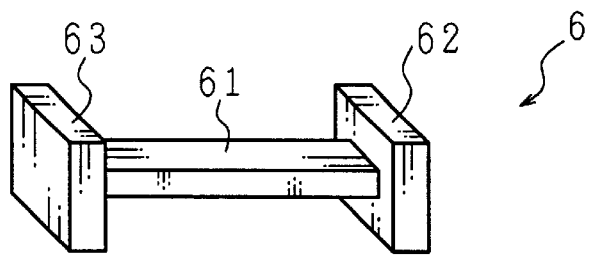
FIGS. 2(a) through 2(d) are explanatory views explaining a process of production of a coil in the magnetic head.
Figure 2:
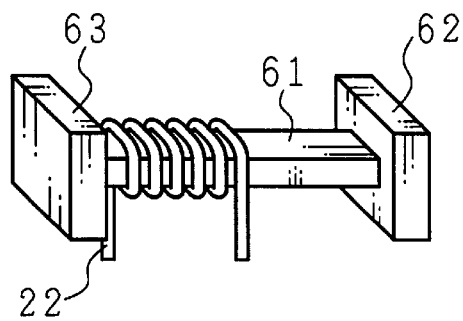
Figure 2:
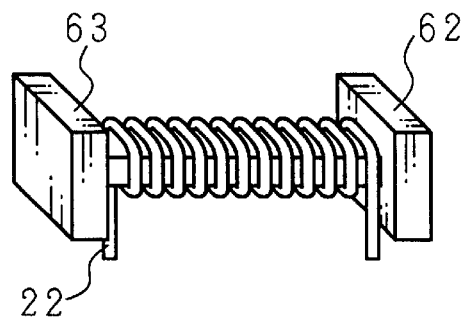
Figure 2:
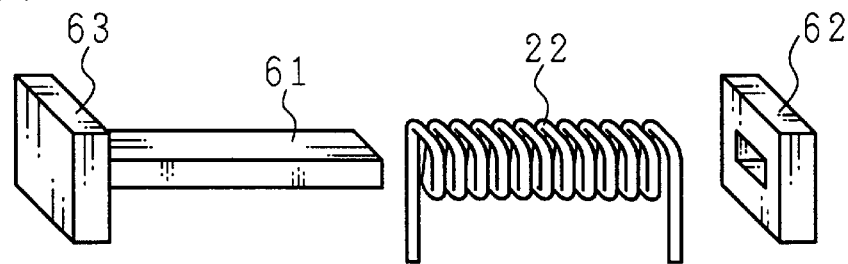

The following description will explain an embodiment of the present invention while referring to FIGS. 1 through 5. Incidentally, the members having the same structure (function) as those in the above-mentioned prior art will be designated by the same reference numerals and their description will be omitted.

A magnetic head in accordance with the present embodiment has a single magnetic pole 1 as shown in FIG. 1. The magnetic head used in the present embodiment has a magnetic pole 11 composed of a magnetic body (here, Mn—Zn ferrite) in a pillar shape having a 0.4 mm×0.4 mm cross section. The cross section of the magnetic pole 11 is not particularly limited to a square, but it may be a rectangle, a circle, etc., as long as the magnetic pole 11 is shaped in a pillar.

A surface of an end of the foregoing magnetic pole 11 is brought into contact with a magnetic base 12 (Mn—Zn ferrite) in a plate form, 0.5 mm thick, having a 2 mm×2 mm cross section. The magnetic pole 11 and the magnetic base 12 are arranged in a two-piece structure, or may be integrally formed. In the case where they are integrally formed, it may be formed by baking powdery materials into the foregoing shape, that is, by so-called sintering, or alternatively it may be sculptured out of a large plate-like material.

The coil section in accordance with the present embodiment does not include a bobbin, and the coil 22 is formed 0.5 mm×0.5 mm in size, and 0.4 mm in height. A diameter of a wire of the coil 22 is 40 μm, for example.

As to the bobbin-less magnetic head arranged as above, the coil 22 is prepared beforehand by a method described later, with its height adjusted. This core-less coil 22 is provided on the magnetic base 12, out of contact with the magnetic pole 11.

In other words, since the coil 22 is formed larger (for example, one size larger) than the magnetic pole 11, the position of the coil 22 may be adjusted by observing arrangements of respective members from above the magnetic pole 11 by means of a microscope, a TV camera, or the like. In so doing, the coil 22 can be provided on the magnetic base 12 in a state in which the contact between the magnetic pole 11 and the coil 22 is avoided. This enables to surely prevent the coil 22 from coming into contact with the magnetic pole 11 even if the coating layer such as enamel coating the coil 22 is imperfect. The coil 22 may be directly wound around the magnetic pole 11 in the case where the coating such as enamel thereof is perfect.

Provision of the coil 22 on the magnetic base 12 is carried out as follows. After the coil 22 is precisely positioned in the aforementioned manner, the coil 22 and the magnetic base 12 are made to adhere by means of a heat curing adhesive or the like. The adhesive is not particularly limited to the heat curing type, but it may be an UV-curing-type or thermoplastic-type adhesive, as long as it has high heat-resistivity so as to be sufficiently resistive against a rise of temperature of the coil 22 upon driving the magnetic head.

As described above, the coil 22 is preferably provided on the magnetic base 12. The reason is described below.

Figure 6:
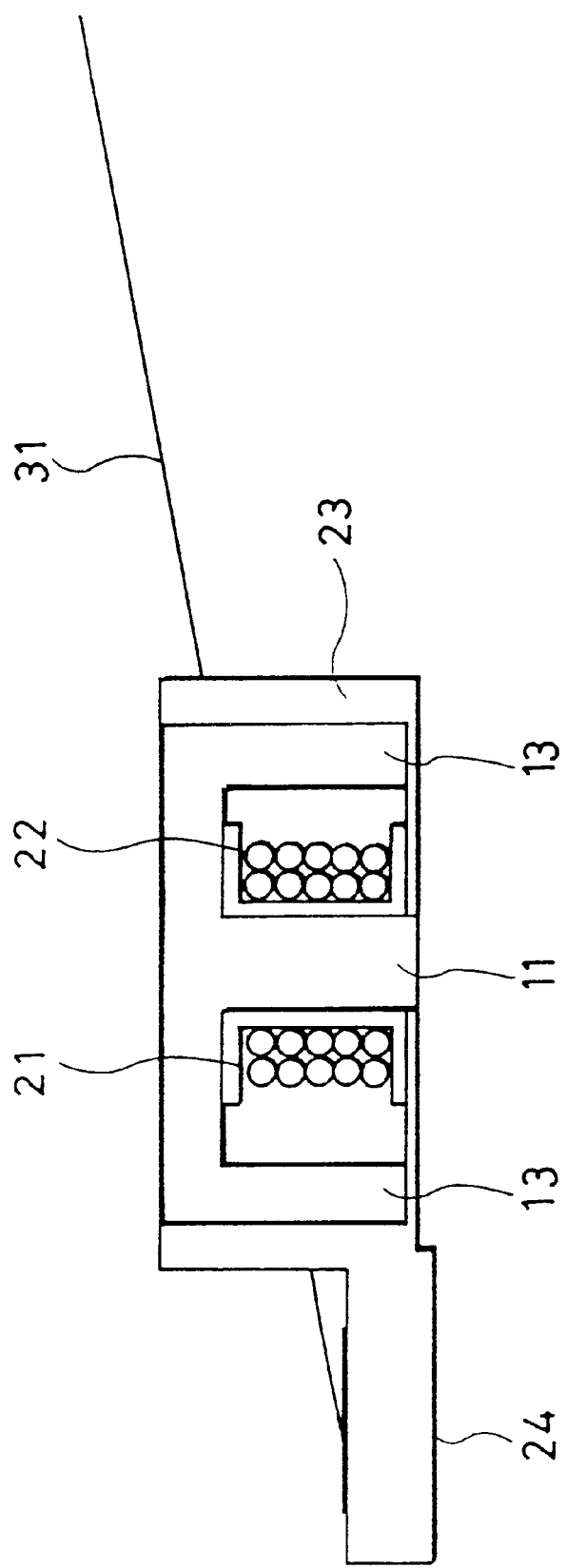
FIG. 6 is an explanatory view illustrating an arrangement of a conventional magnetic head.
Figure 7:
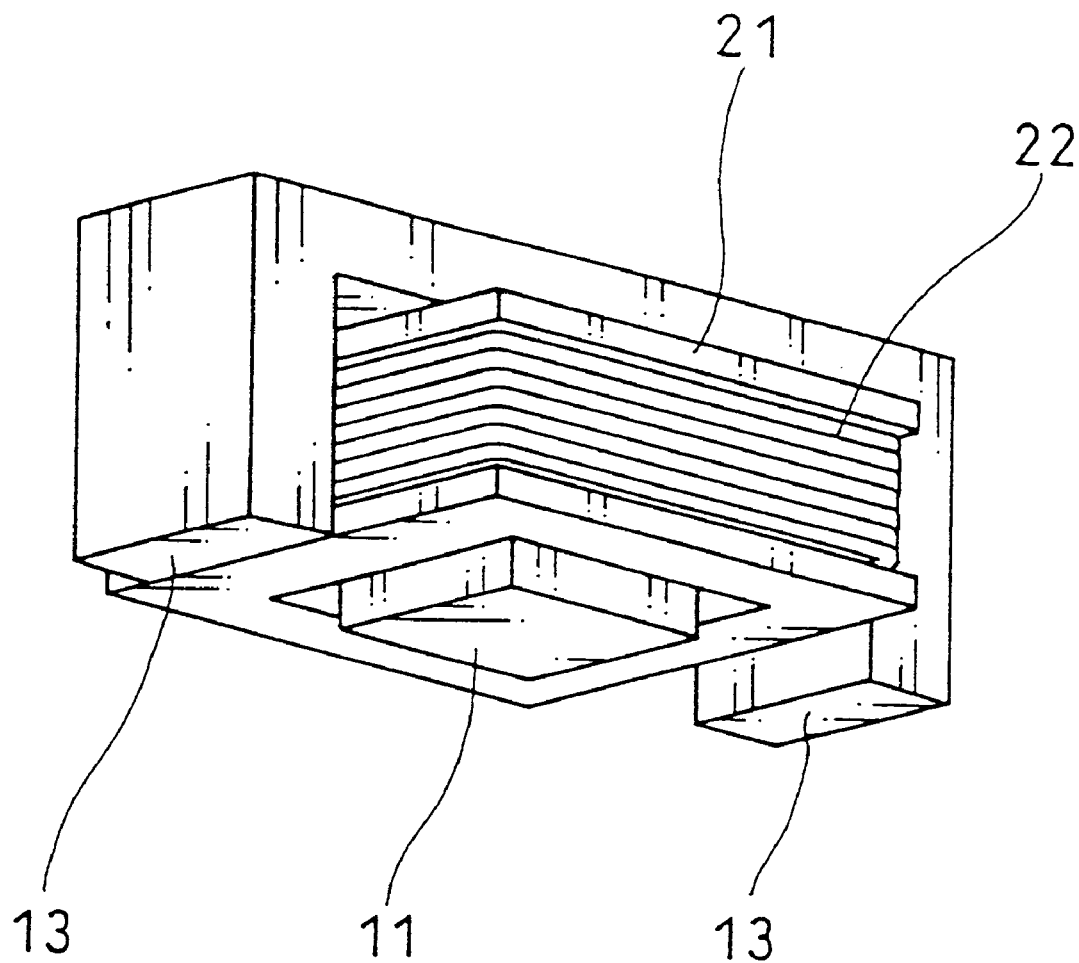
FIG. 7 is an explanatory view illustrating details of the magnetic head shown in FIG. 6.
Figure 8:
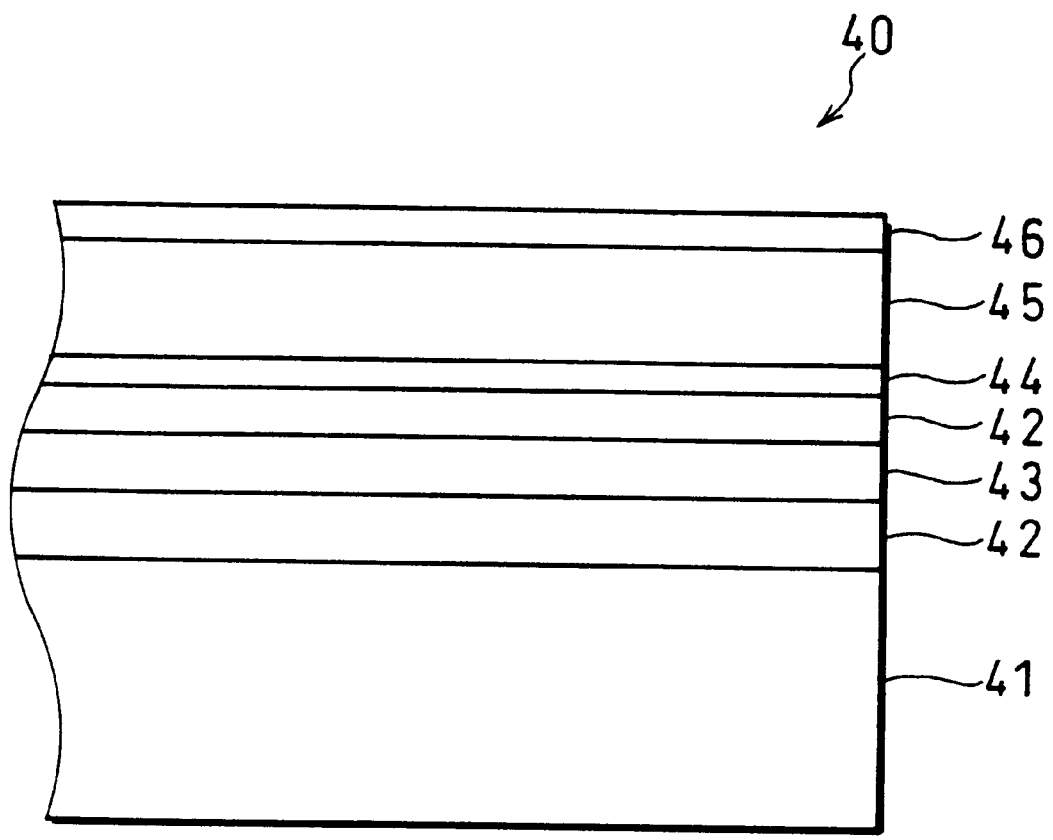
FIG. 8 is an explanatory view illustrating an arrangement of a magneto-optical recording medium.

Conventionally, the coil 22 is wound around the bobbin 21 and encircled by the yokes 13, as shown in FIG. 6. Therefore, heat generated at the magnetic pole 11 and the coil 22 is accumulated in a space defined by the bobbin 21 and the yokes 13, not being dissipated to outside the magnetic head. The bobbin 21 is made of an insulating material, inferior in dissipation of heat, thereby being incapable of dissipating the heat generated by the coil 22.

To cope with this, the coil 22 is provided on the magnetic base 12. By so doing, the heat generated at the coil 22 is conducted to the magnetic base 12, and is dissipated therefrom. The heat generated at the magnetic pole 11 is also conducted to the magnetic base 12, and is dissipated therefrom, too. Thus, cooling is realized. Furthermore, since there is neither yoke nor bobbin that prevents dissipation of heat from the magnetic pole 11 and heat from the coil 22, generation of heat at the magnetic head is surely suppressed as a whole.

The following description will explain a method for producing the coil 22, while referring to FIGS. 2(a) through 2(d).

As shown in FIG. 2(a), a coil producing member 6 is composed of a core part 61 around that the coil 22 is wound, and control members 62 and 63 for controlling the height of the coil 22. At least one of the regulating members 62 and 63 is detachably provided to the core part 61. Note that in this example the regulating member 62 is detachably provided to the core part 61. The core part 61 may have a shape appropriately selected in accordance with the magnetic pole 11 such that the coil 22 wound therearound is out of contact with the magnetic pole 11.

Furthermore, the core part 61 is formed so as to have a circumferential length (length in a direction in which the coil 22 is wound) longer than the circumferential length of the magnetic pole 11, that is, for example, 0.5 mm×0.5 mm. This enables to surely prevent the coil 22 wound up from being brought into contact with the magnetic pole 11. A space between the regulating members 62 and 63 is adjusted to a height of the coil 22, that is, 0.5 mm in the present embodiment.

By using the coil producing member 6 having the foregoing arrangement, the coil 22 is produced as follows. In a state in which the regulating members 62 and 63 are set, the coil 22 is wound around the core part 61 (see FIG. 2(b)).

When the winding is finished (see FIG. 2(c)), the shape of the coil 22 is fixed by applying an adhesive over an entirety of the coil 22, or by solvent adhesion, etc. Then, the regulating member 62 is removed from the core part 61, so that the coil 22 is taken out of the coil producing member 6 (see FIG. 2(d)). Since the coil 22 is fixed with an adhesive as described above, the coil 22 does not lose shape, even when the coil 22 is taken out of the coil producing member 6. Thus, the coil 22 keeps its shape.

The coil 22 thus produced is adjusted to desired size and shape, having a desired height (0.4 mm) and a desired cross section (0.5 mm×0.5 mm). The height of the coil 22 can be adjusted by adjusting a space between the regulating members 62 and 63, and the shape of turns of the coil 22 can be determined so as to be circular, or rectangular, etc., by changing a cross section of the core part 61.

Incidentally, in FIG. 1, the drawing of the coil 22 is a partially-cut-away view, so that the magnetic pole 11 should be shown better. The coil 22 herein has 30 T (turns) and an inductance of approximately 3 $\mu$H. Magnetic fields generated by the coil 22 have an intensity of 200 Oe when direct current of 0.2A is applied to the coil 22, according to measurement at a distance of 50 $\mu$m from the magnetic pole face of the magnetic pole 11.

The conventional magnetic head having an E-shape or centric magnetic core (hereinafter simply referred to as E-shape magnetic head or centric magnetic head) is arranged so as to include yokes for increasing the intensity of the perpendicular magnetic fields (see, for example, the yokes 13 in FIG. 6), but no yokes are provided in the magnetic head of the present embodiment.

In other words, conventionally, magnetic fields with an intensity of 200 Oe that are necessary on the magnetic pole face of the magnetic pole 11 can be obtained by means of yokes, even in the case where the magnetic field distribution between the central core section (corresponding to the magnetic pole 11) and the yokes is not made abrupt.

Conversely, according to the present embodiment, the magnetic field distribution becomes broad by omitting the yokes, but high-density recording can be carried out without any problems, without being affected by the magnetic field distribution, since only a heated portion irradiated by a light beam or the like contributes to the recording.

Comparison was carried out, by using an E-shape magnetic head having the same magnetic pole shape, that is, having a cross section of 0.4 mm×0.4 mm. The number of turns was adjusted so that the same inductance was obtained. As a result of adjustment, an equal inductance was obtained when the turns were 28 in number. Direct current (current to be applied to the coil 22) causing the perpendicular magnetic fields to have an intensity of 200 Oe at a distance of 50 $\mu$m from the magnetic pole face was 0.21A.

The heat generation at the magnetic head was measured by means of an infrared thermometer of a non-contact type. Conditions of the measurement were adjusted so that respective intensities of the magnetic fields generated at both the magnetic heads become equal to each other. As described above, the current to be applied to the coil 22 was set to ±0.2A in the case of the magnetic head of the present invention, while it was set to ±0.21A in the case of the conventional E-shape magnetic head. As to the driving conditions, (1,7)RLL random signals having the shortest mark length of approximately 10 MHz were used, and heat generated in the magnetic core (ferrite) was evaluated. The magnetic core and the coil were kept under a condition of room temperature, and was not cooled.

The result of the evaluation of heat generation shows that the temperature rose to 115° C. in the case of the magnetic head of the present invention, and that the temperature rose to 138° C. in the case of the conventional E-shape magnetic head. It can be seen that the heat generation was suppressed better in the case of the magnetic head of the present invention since the magnetic flux density was lower in the magnetic pole 11 therein. From this result, it is found that the temperature rise at the magnetic head of the present invention can be suppressed by more than 20° C. as compared with the conventional E-shape magnetic head.

By utilizing the foregoing characteristics in improving the current amplitude, or magnetic field intensity, the magnetic head of the present invention can excel the conventional magnetic head, in the aspect of the recording transfer rate with respect to a magneto-optical recording medium, as well as applicability to a high-density recording medium requiring relatively high recording magnetic field intensity, for example, a MSR recording medium having a multilayer film.

Generally, heat generation in the magnetic head depends on the recording frequency and the amplitude of a driving current. Accordingly, use of the magnetic head of the present invention enables the recording at a higher frequency, as well as application of a greater electric current to the coil 22 (enables the recording by means of magnetic fields of higher intensity).

Figure 3:
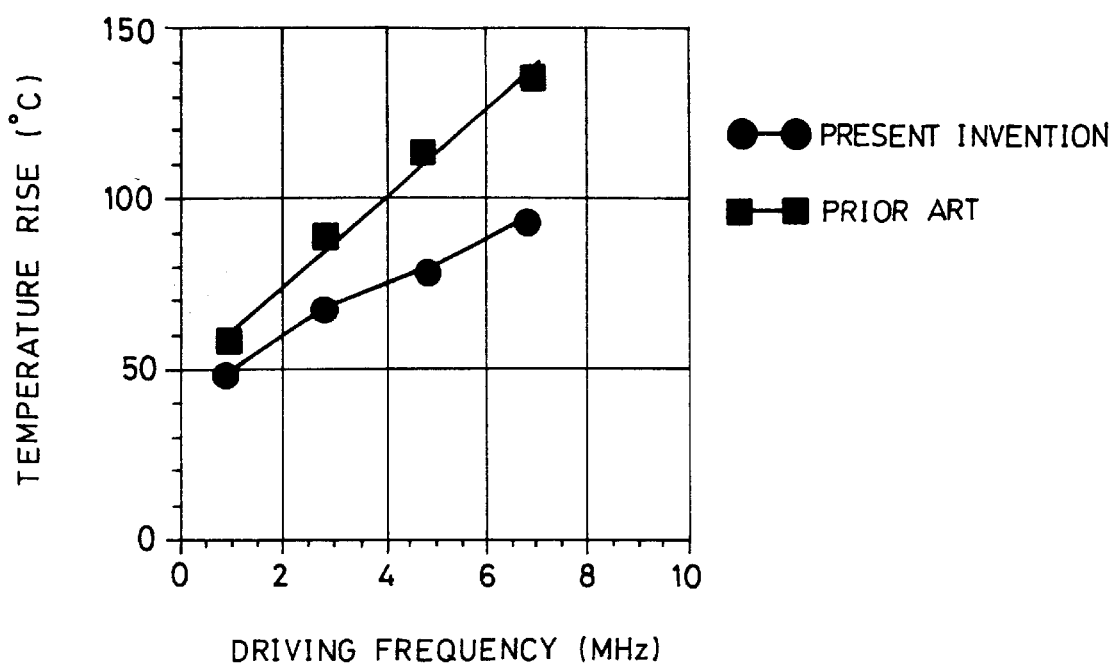
FIG. 3 is a graph illustrating frequency dependency of heat generation at the magnetic head shown in FIG. 1.

FIG. 3 shows heat generation at the respective magnetic heads in the case where the driving frequency was varied in a range of 1 MHz to 7 MHz. The driving current amplitude was set to the same level as that in the evaluation of the foregoing heat generation. As clear from the foregoing figure, the obtained result was that heat generation at the magnetic head of the present invention was smaller at any frequency in the foregoing range.

From the foregoing result, it can be seen that the magnetic head of the present invention causes smaller heat generation as compared with that of the conventional E-shape magnetic head, thereby allowing the recording at a frequency higher than that in the conventional case. The foregoing result also indicates that in the case where the same temperature rise is permitted, a greater current amplitude can be obtained at the same recording frequency that is applied in the conventional case.

In other words, at the same recording frequency, the magnetic head of the present invention can generate magnetic fields of a higher intensity than the magnetic head. This enables recording with a sufficient magnetic field intensity even particularly with respect to magneto-optical recording media of inferior magnetic field sensitivity, multilayer film recording media such as a MSR recording medium. Namely, the magnetic head of the present invention enables recording to be performed even onto recording media to which recording cannot be carried out by the conventional magnetic head.

Furthermore, it was confirmed that the magnetic head of the present invention caused the efficiency of magnetic field generation at the center of the magnetic pole 11 and the intensity of the generated magnetic field per a unit electric current with a set number of turns of the coil to increase as compared with those in the case of the conventional E-shape magnetic head.

Then, the following description will depict comparison regarding the magnetic field intensity and the heat generation, between the magnetic head in accordance with the present invention in which the coil 22 is provided in direct contact with the magnetic base 12 and the magnetic head in which the coil 22 is provided in indirect contact with the magnetic base 12 with the bobbin intervening between them.

In the foregoing cases, bobbins with the same inner diameter were used, respectively. The coil 22 of the former was arranged so that a bottom surface thereof was in direct contact with the magnetic base 12 having a flat surface (according to the present invention), and the coil 22 of the latter was in indirect contact with the magnetic base 12 having a flat surface, with an end of a bobbin (the end had a thickness of 50 μm) intervened between them. By comparing the foregoing two that were thus differently arranged, functions and effects of the coil 22 arranged in direct contact with the magnetic base 12 were made clearer.

Experimental results of the magnetic field intensity measurement proved that magnetic heads that had magnetic cores (magnetic poles 11) in the same shape and that had the same number of turns of coils generated magnetic fields of substantially equal intensities on the magnetic pole face of the magnetic poles 11, irrespective of distances between the magnetic pole 11 and the coil 22, as well as irrespective of presence/absence of the bobbin.

In the evaluation of heat generation, the same magnetic head that was used in comparison with the E-shape magnetic head was used. As to the driving conditions, (1,7)RLL random signals having the shortest mark length of about 10 MHz were used, and the amplitude of the current to be applied to the coil 22 was set to ±0.2A. Under the foregoing conditions, heat generated in the magnetic core (ferrite) was evaluated. The magnetic core and the coil were kept at room temperature, and was not cooled, as in the aforementioned heat evaluation case.

The temperature rose to 115° C. in the case of the arrangement of the coil and the bobbin of the present invention, whereas the temperature rose to 127° C. in the case where the bobbin was used in the conventional manner. Thus, it can be seen that the rise of temperature was suppressed better for 12° C., in the case of the present invention.

According to the foregoing result, the use of the magnetic head of the present invention enables suppression of heat generation at the magnetic head. An arrangement without a bobbin is preferable as the arrangement of the present invention, since in this case the number of members related to the magnetic head can be reduced. Consequently, the costs and the number of steps in the process for producing the magnetic head can be surely reduced.

The foregoing description is given by way of example with reference to a case where a magneto-optical recording medium is used as a recording medium, but the present invention should not be limited to this. The recording medium used may be any recording medium as long as it is arranged so that recording is carried out by applying magnetic fields to a heated recording portion thereof. The means for heating a recording portion is not limited to a light beam, but it may be anything as long as it causes the temperature at the recording portion to rise.

Simulation was carried out with use of the magnetic head in accordance with the present invention, so that comparison and examination should be carried out.

The magnetic head was arranged so that the magnetic base had a 2 mm×2 mm cross section and a thickness of 0.5 mm, and that the magnetic pole 11 had a 0.4 mm×0.4 mm cross section. While varying the height of the magnetic pole 11 in the foregoing magnetic head, an intensity of perpendicular magnetic fields at a position of 50 μm above the magnetic pole center was measured.

Figure 4:
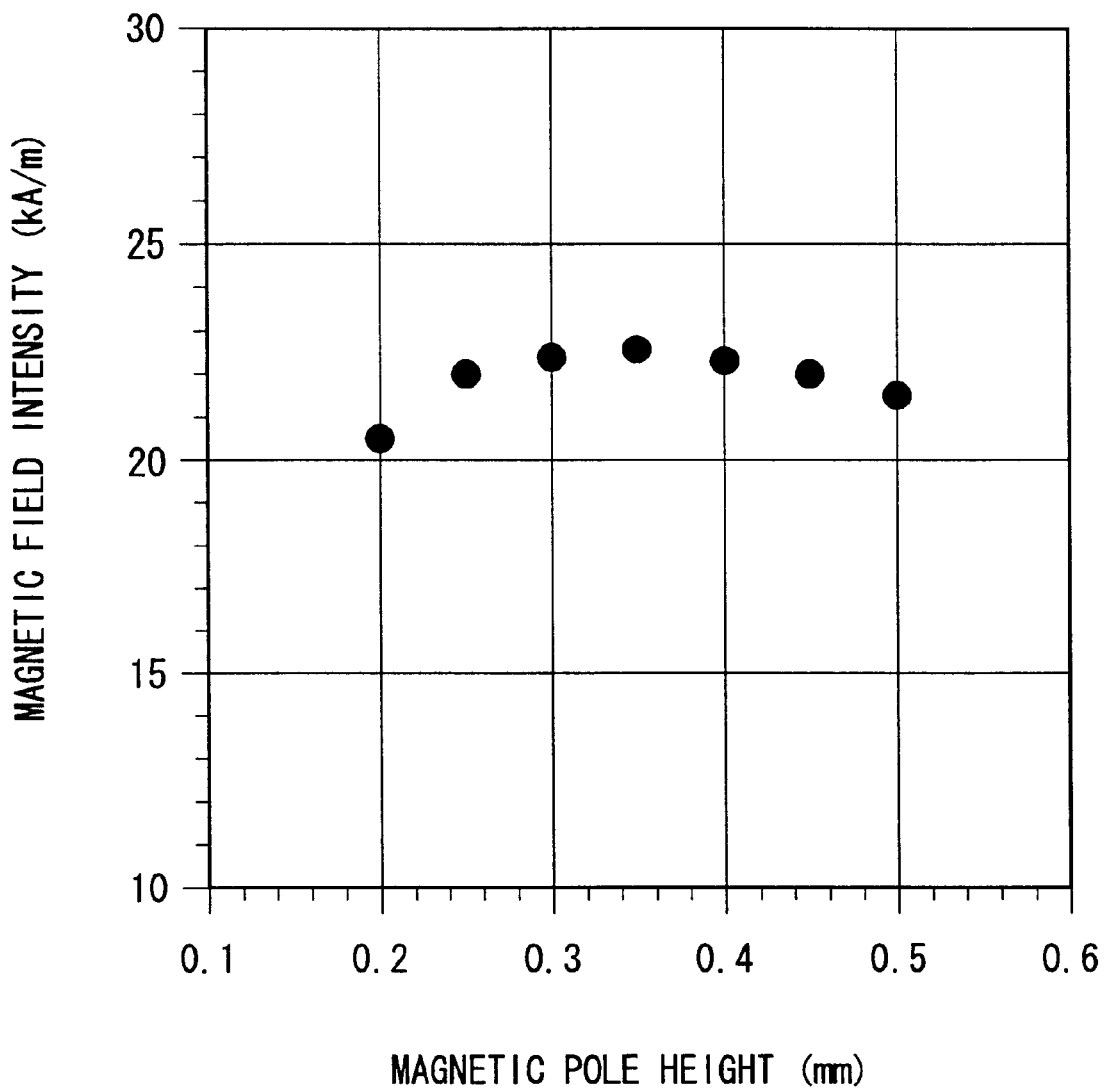
FIG. 4 is a graph illustrating relationship between magnetic pole height and perpendicular magnetic field intensity in the case where the number of turns of the coil is set uniform.

The number of turns of the coil was set to 40T, and an aspect ratio of the coil was changed in accordance with the height of the magnetic pole. Then, an intensity of perpendicular magnetic fields at a position of 50 μm above the magnetic pole center was measured when the coil current was set to 0.2A. FIG. 4 illustrates a result obtained in the case where the number of turns of the coil was set, and it can be seen that the magnetic field intensity became maximum when the magnetic pole height was 0.35 mm.

Figure 5:
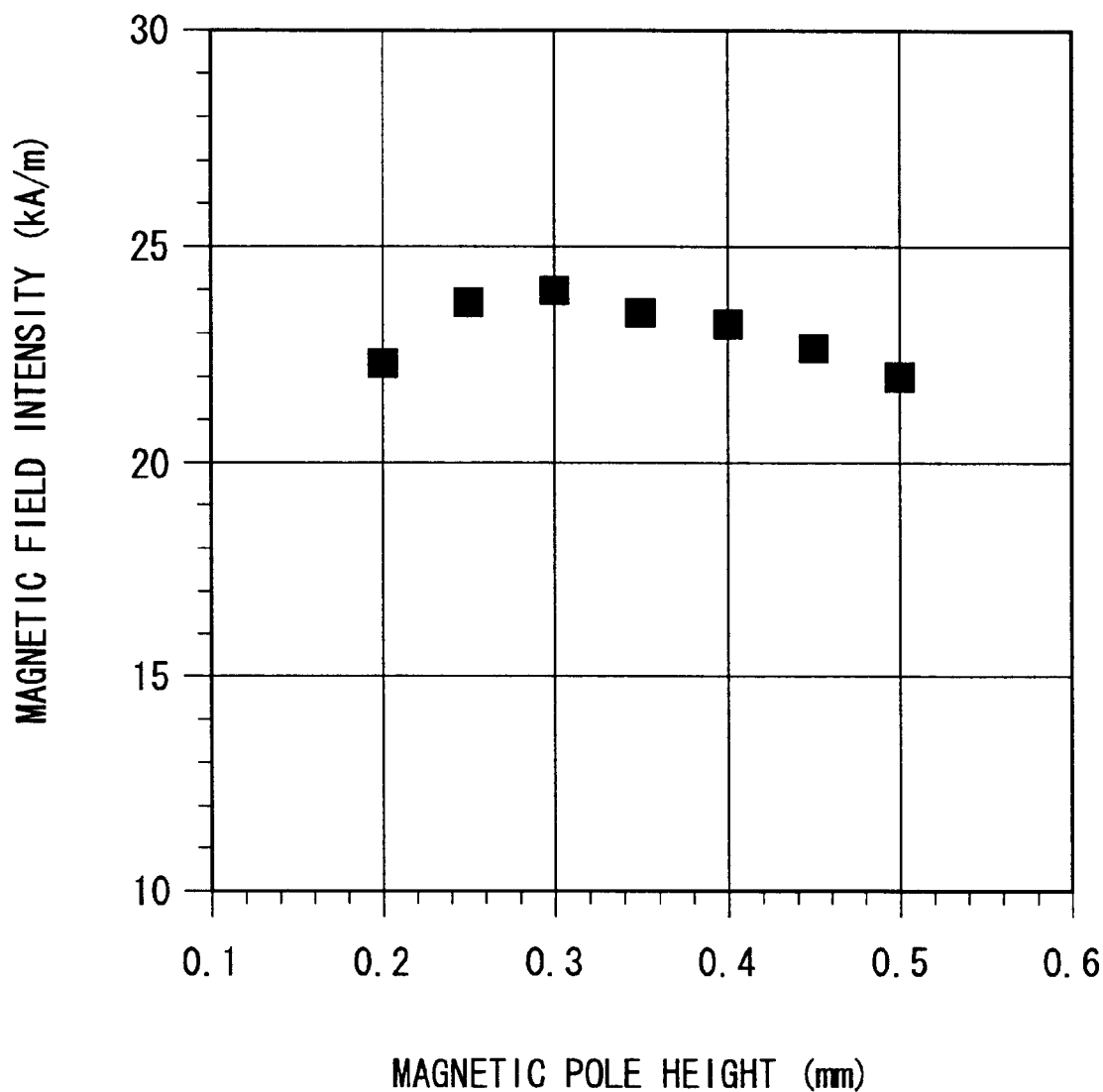
FIG. 5 is a graph illustrating relationship between magnetic pole height and perpendicular magnetic field intensity in the case where inductance is set uniform.

As the magnetic pole height is changed, the coil shape accordingly varies, and further, the inductance also varies. Then simulation was carried out to determine the magnetic field intensity when the coil current was constant, by adjusting the number of turns of the coil so as to make the inductance constant. Since the inductance was constant, the load on the magnetic head driver was equivalent. FIG. 5 illustrates relationship between the magnetic field intensity and the magnetic pole height when the number of turns was adjusted so that the inductance should be constant. Here, the number of turns of the coil was adjusted so that an inductance of 3 μH should be obtained, while the coil current was set to 0.2A. The intensity of the magnetic fields was an intensity of perpendicular magnetic fields at a position of 50 μm above the magnetic pole center. From the shown result, it can be seen that the optimum magnetic field intensity was obtained when the magnetic pole height was 0.3 mm.

In the case where the magnetic pole height exceeds 0.25 mm, however, a difference in the magnetic field intensity due to the difference in the magnetic pole height becomes smaller. Therefore, by setting the magnetic pole height greater than 0.25 mm, a sufficient and stable magnetic field intensity can be obtained. In other words, the magnetic pole height is most preferably set to the vicinity of 0.35 mm, but a sufficient magnetic field intensity can be obtained in the case where the magnetic pole height is adjusted in a range of 0.25 mm to 0.5 mm.

By adjusting the magnetic pole height in the foregoing range, a sufficient magnetic field intensity can be obtained, and the efficiency of the magnetic field generation can be improved. The improvement of the efficiency of the magnetic field generation leads to reduction of current flowing through the coil, thereby leading to effective suppression of power consumption and heat generation at the magnetic head.

The magnetic head of the present invention for applying to a temperature-rising portion in a recording region magnetic fields that vary in accordance with recording information is characterized by the following arrangement.

Namely, the foregoing magnetic head includes (i) a single magnetic pole in a pillar shape provided on a magnetic body, having one end surface in contact with the magnetic body, and (ii) a coil that is wound around the magnetic pole so as to apply electric current for generating the magnetic fields.

According to the present invention, upon application of the magnetic fields that vary in accordance with recording information to the temperature-rising portion in the recording region, a direction of magnetization at the heated portion is changed in accordance with recording information. Thus, the recording information is recorded.

In the present magnetic head, yokes required in a conventional magnetic head having an E-shape magnetic core are unnecessary, since a single magnetic pole is provided. The magnetic flux density in the magnetic pole becomes the lower for the absence of the yokes than that in the case of the conventional magnetic head that requires yokes. Since the magnetic flux density becomes lower, heat generation at the magnetic head is suppressed. In addition, since the foregoing magnetic body has a function of dissipation of heat of the magnetic pole provided on the magnetic body, the heat conducted to the magnetic body is dissipated therefrom. Thus, the cooling is conducted. Consequently, this enables further suppression of rise of temperature.

As described above, since the present magnetic head allows suppression of heat generation, the application of a greater electric current to a coil, or the recording of information at a higher frequency is enabled. Consequently, information can be recorded with magnetic fields of higher intensity.

Furthermore, since the magnetic fields can be made more intensive than that in the conventional case at the same frequency, information can be recorded with a sufficient magnetic field intensity with respect to a recording medium with an inferior sensitivity to the magnetic fields such as a MSR recording medium. As a result, this enables the recording to a recording medium to that the conventional magnetic head cannot carry out recording.

Furthermore, according to the present invention, the absence of yokes causes the magnetic field distribution from the magnetic pole to become broad, but only a heated portion contributes to the recording, thereby allowing high-density recording to be carried out without any problems, without being affected by the magnetic field distribution.

In the foregoing magnetic head, the coil is preferably wound around in a manner such that the coil is out of contact with the magnetic pole.

In this case, even if the coating with, for example, enamel, over the coil is imperfect, contact of the coil with the magnetic pole can be surely avoided.

The foregoing coil is preferably provided on the magnetic body.

Conventionally, the coil is wound around a bobbin and encircled by yokes, thereby resulting in that heat generated at the magnetic pole and the coil is accumulated in a space defined by the bobbin and the yokes, not being dissipated to outside the magnetic head. Besides, the heat of the yokes is conducted to the coil and the magnetic pole, thereby raising the temperature at the coil and the magnetic pole. The bobbin is made of an insulating material, inferior in dissipation of heat, thereby being incapable of dissipating the heat generated by the coil. These cause the heat generated at the magnetic head to further increase.

To solve this problem, the foregoing coil is provided on the magnetic body, so that the heat generated at the coil is conducted to the magnetic body, thereby being dissipated. The heat generated at the magnetic pole is also conducted to the magnetic body, thereby being dissipated. Besides, since there are neither yoke nor bobbin that hinders dissipation of heat from the magnetic pole and heat from the coil, generation of heat at the magnetic head is surely suppressed as a whole.

Moreover, since a bobbin is unnecessary, the number of members related to the magnetic head can be reduced. Consequently, the costs and the number of steps in the process for producing the magnetic head can be surely reduced.

Furthermore, the magnetic pole preferably has a height in a range of 0.25 mm to 0.5 mm.

In this case, the rate of generation of magnetic fields can be improved, as compared with the case of the conventional magnetic head. Consequently, an improved efficiency of a magnetic field generation than that in the case of the conventional magnetic head can be achieved. This leads to suppression of heat generation, thereby allowing recording at a higher frequency. This leads to an increase of a data transfer rate, thereby allowing, for example, higher image quality to be achieved in the case where images are recorded. The intensity of the recording magnetic fields can be made greater than conventionally, and therefore, the magnetic head of the present invention is applicable in the case where the magnetic field intensity required for recording is greater.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic head for switching a direction of magnetic fields to a temperature-rising portion in a recording region in accordance with recording information, said magnetic head comprising:

a single magnetic pole in a pillar shape provided on a magnetic body, having one end surface in contact with said magnetic body; and a coil that is wound around said magnetic pole so as to apply electric current for generating said magnetic fields, wherein said magnetic pole has a height in a range of 0.25 mm to 0.5 mm.

2. The magnetic head as set forth in claim 1, wherein said coil is wound around said magnetic pole and out of contact with said magnetic pole.

3. The magnetic head as set forth in claim 2, wherein said coil is formed into a shape substantially identical to a shape of said magnetic pole.

4. The magnetic head as set forth in claim 1, wherein said coil is provided on said magnetic body.

5. The magnetic head as set forth in claim 1, wherein a shape of said coil is fixed by means of a fixing member.

6. The magnetic head as set forth in claim 1, wherein said magnetic pole has a height of approximately 0.3 mm.

7. The magnetic head as set forth in claim 1, wherein said magnetic pole and said magnetic body are integrally provided.

8. The magnetic head as set forth in claim 1, wherein said magnetic pole and said magnetic body are made to adhere to each other and fixed with use of a heat curing resin.

9. The magnetic head as set forth in claim 2, wherein said coil is wound before being placed around the magnetic pole.

* * * * *